United States Patent [19]

Kraus

[11] 4,400,987

[45] Aug. 30, 1983

[54] INFINITELY VARIABLE TRACTION ROLLER TRANSMISSION

[75] Inventor: James H. Kraus, Huntington Beach, Calif.

[73] Assignee: Excelermatic Inc., Austin, Tex.

[21] Appl. No.: 218,643

[22] Filed: Dec. 22, 1980

[51] Int. Cl.³ .............................................. F16H 15/40
[52] U.S. Cl. ....................................................... 74/200
[58] Field of Search ........................... 74/198, 199, 200

[56] References Cited

U.S. PATENT DOCUMENTS

| | | | |
|---|---|---|---|
| 2,318,471 | 5/1943 | Dodge | 74/200 |
| 3,164,025 | 1/1965 | Francisco, Jr. | 74/200 |
| 3,810,398 | 5/1974 | Kraus | 74/200 |
| 4,086,820 | 5/1978 | Kraus et al. | 74/200 |

*Primary Examiner*—Kenneth Dorner
*Attorney, Agent, or Firm*—Klaus J. Bach

[57] ABSTRACT

An infinitely variable traction roller transmission has traction rollers arranged pivotally between two toric traction discs with which they are engaged at variable pivot positions for transmitting motion at a variable transmission ratio. The toric discs are provided with flanges along which the traction rollers are guided in their pivotal end positions.

3 Claims, 3 Drawing Figures

INFINITELY VARIABLE TRACTION ROLLER TRANSMISSION

BACKGROUND OF THE INVENTION

The invention relates to an infinitely variable traction roller transmission in which motion is transmitted from a toric disc mounted on an input shaft to a toric disc mounted on an output shaft by traction rollers which are pivotally supported between the toric discs and disposed in engagement with variable diameter circles of the toric discs.

In such transmissions, the traction rollers are pivotally supported on support trunnions which are usually axially movable to initiate changes of the transmission ratio. Such transmission ratio change is possible in a wide range between the two roller pivot end positions in which the traction rollers engage the smallest circle area of one and the largest circle area of the other of the input and output toric discs and vice versa. The pivot end positions of the traction rollers are determined by stop members associated with the traction roller support trunnions. However, even in the pivot end position, there may be forces applied urging the traction rollers to further transmission change or the rollers may not be in perfect position which results in spin of the rollers accompanied by losses and wear of the traction surfaces.

SUMMARY OF THE INVENTION

In an infinitely variable traction roller transmission in which the power transmitting traction rollers are disposed between toric input and output discs and mounted on pivotal support trunnions to permit change of the transmission ratio, the toric discs have flanges preferably at their outer circumference which flanges limit pivotal movement of the traction rollers and guide the traction rollers in their pivotal end positions. If arranged at the outer edge of the toric discs, lubricant at the flanges will cause some drag when the traction rollers approach the flanges and the drag forces will steer the traction rollers away from the flanges so that the traction rollers will actually never contact the flanges.

DESCRIPTION OF THE PREFERRED EMBODIMENTS

Figure 1:
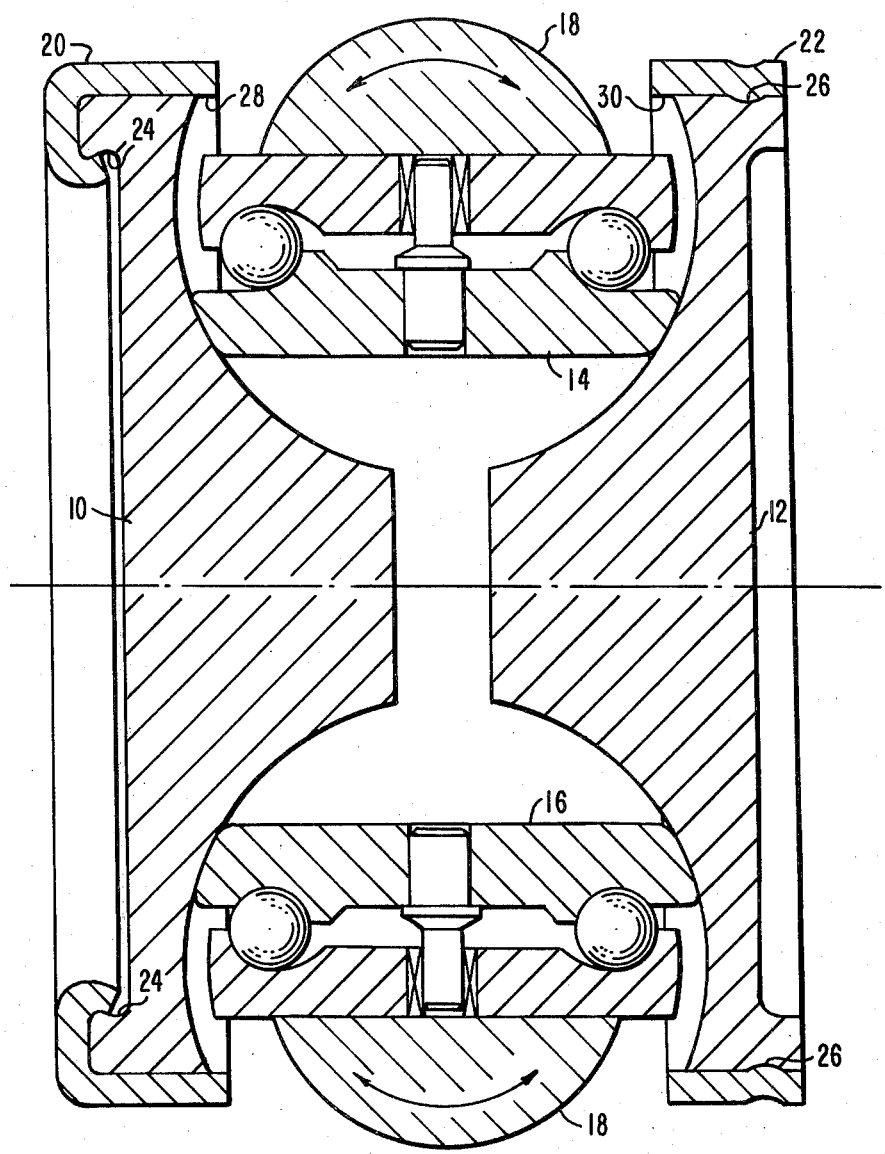
FIG. 1 shows schematically a traction roller arrangement with two opposite toric discs with transmission ratio limiting flanges in accordance with the invention.

Transmissions of the type with which the present invention is concerned are described in detail in U.S. Pat. Nos. 4,086,820 and 3,810,398. Design details are therefore not described herein. For an understanding of the invention, it is sufficient to show, as FIG. 1 does, the traction roller arrangement with the two toric input and output discs 10 and 12 between which the traction rollers 14 and 16 are supported by pivotal support trunnions 18 for the transmission of motion between the input and output discs 10 and 12. The trunnions are movable axially and are moved axially out of a neutral position if a change of the transmission ratio is desired as clearly described in the patents referred to hereabove. When the traction rollers 14, 16 are in one pivotal end position in which they engage the input toric disc at its outer edge and the output toric disc at its radially inner end, the transmission provides for the greatest speed-up radio; when the traction rollers in their other end positions engage the input toric disc at its inner end and the output toric disc at its outer end, the transmission is at the greatest speed reduction ratio.

In order to guide the rollers properly along the edges of the toric discs the toric discs are provided with circumferential guide flanges 20 and 22. They are preferably formed separately and crimped onto the toric discs 10 and 12. Flange 20 is shown crimped around the side of disc 10 and into an inner circumferential groove 24 and flange 22 is shown crimped into an outer circumferential groove 26 of the toric disc 12. The flanges 20 and 22 project axially toward each other to form rims 28 and 30 by which the traction rollers are guided into their proper end position paths such that spin is avoided. The flanges act like the shoulders on roller bearings. They may be provided also at the inner end of the toric disc but the outer end is the much preferred location mainly because of lubrication considerations: Centrifugal forces will always provide for a sufficient oil film at the outer end of the discs to prevent scuffing when the rollers contact the flanges.

Figure 2:
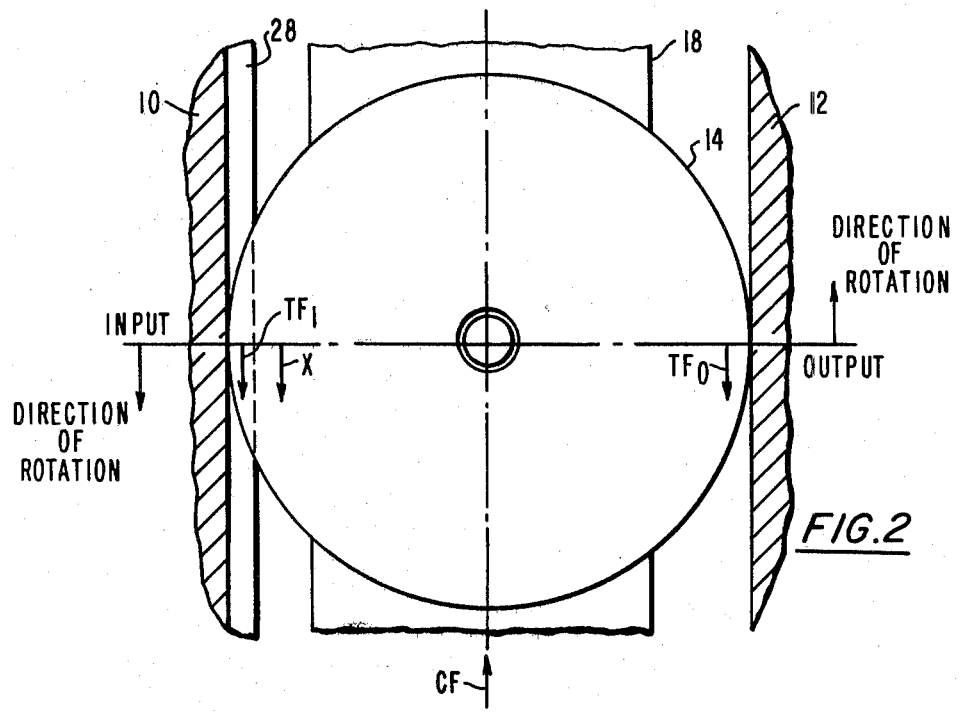
FIG. 2 shows a traction roller schematically in full speed-up position for explanation of the tiltcorrecting forces.
Figure 3:
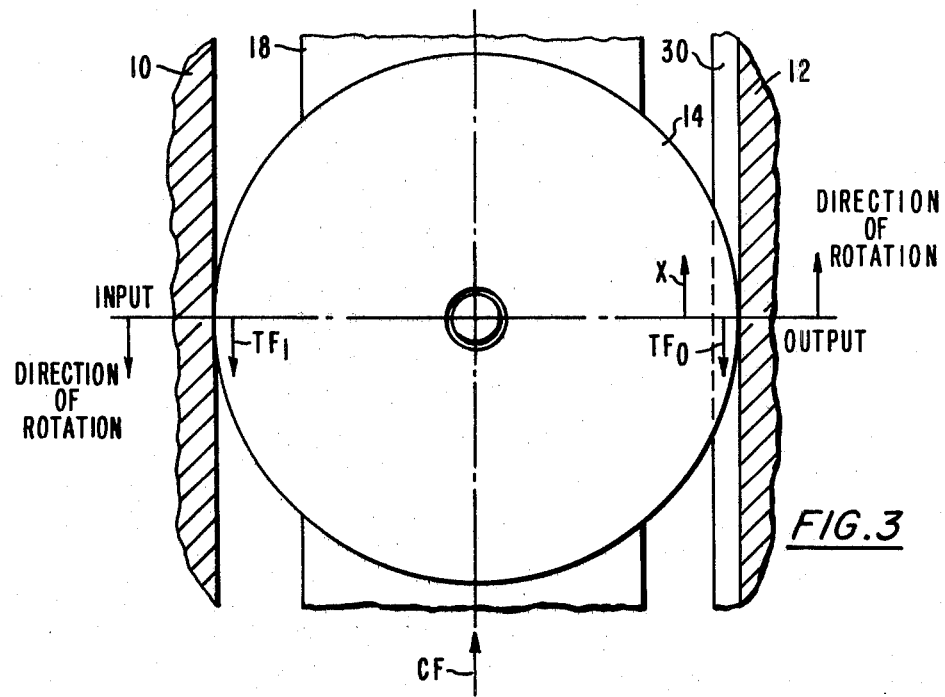
FIG. 3 shows a traction roller in full speed-reducing tilt position with the forces acting thereon.

FIGS. 2 and 3 indicate the forces guiding the rollers along the flanges with a load-type transmission ratio control system. As a roller 14 approaches the rim 28 of the input disc 10, there will occur a drag force X which is added to the forces $TF_1$ and $TF_0$ (Traction Forces) on the traction roller 14 (FIG. 2). The control system force CF is normally equal the sum of the traction forces $TF_1 + TF_0$ to balance the traction forces so as to maintain the traction rollers in balanced positions. The additional drag force X causes movement of the trunnion 18 and the roller 14 against the system force CF thereby steering the traction roller 14 away from the rim 28 until the additional drag force X disappears, that is until the traction roller clears the rim 28.

FIG. 3 shows the traction roller in its tilted end position adjacent the rim 30 of flange 22. Again the traction forces $TF_1$ and $TF_0$ are directed oppositely but combined are equal to the control system force CF. The drag force X however is in the same direction as the control force CF thereby moving the trunnion 16 and the roller in the direction of control force CF steering the roller 14 away from the flange 22 of the output disc 12.

Accordingly drag generated when the traction rollers contact or rather approach the guide flanges provides for movement of the traction roller away from guide flange resulting in a reduction of drag.

Actually, contact between the traction rollers and guide flanges will not occur since drag is already generated by the lubricant present on the rims 28 and 30, which drag steers the rollers away from the guide flanges.

A flange material of carburized or nitrided case hardened steel may be used. Fully hardened steel could also be used if the flange would be suitably attached by pins, keys or screws. Also, the flanges may be shrink fitted onto the toric discs.

What I claim:

1. An infinitely variable traction roller transmission comprising coaxial input and output toric discs rotatably supported opposite each other and defining a toric space therebetween; at least two motion transmitting traction rollers disposed in the toric space between said toric discs; said traction rollers and toric discs being in engagement with each other for the transmission of motion, and a pivotal support structure supporting said traction rollers so as to permit pivoting of said traction rollers between two pivotal end positions for changing the transmission ratio, said toric discs having separate guide flanges of hardened steel mounted thereon at their circumference, said guide flanges projecting axially toward each other so as to form rims at the circumference of said toric discs for guiding the traction rollers in the pivotal end positions.

2. A transmission as recited in claim 1, wherein said guide flanges are crimped onto the toric discs.

3. A transmission as recited in claim 1, wherein said guide flanges are shrink-fitted onto said discs.

* * * * *